(12) United States Patent
Lee

(10) Patent No.: US 12,230,784 B2
(45) Date of Patent: Feb. 18, 2025

(54) LITHIUM METAL BATTERY

(71) Applicant: LG ENERGY SOLUTION, LTD., Seoul (KR)

(72) Inventor: Jeongbeom Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 658 days.

(21) Appl. No.: 17/417,555

(22) PCT Filed: Dec. 19, 2019

(86) PCT No.: PCT/KR2019/018124
§ 371 (c)(1),
(2) Date: Jun. 23, 2021

(87) PCT Pub. No.: WO2020/149539
PCT Pub. Date: Jul. 23, 2020

(65) Prior Publication Data
US 2022/0059815 A1 Feb. 24, 2022

(30) Foreign Application Priority Data

Jan. 17, 2019 (KR) .......................... 10-2019-0006229

(51) Int. Cl.
*H01M 4/134* (2010.01)
*H01M 4/136* (2010.01)
(Continued)

(52) U.S. Cl.
CPC ........... *H01M 4/134* (2013.01); *H01M 4/136* (2013.01); *H01M 4/382* (2013.01); *H01M 4/505* (2013.01);
(Continued)

(58) Field of Classification Search
None
See application file for complete search history.

(56) References Cited

U.S. PATENT DOCUMENTS 9,899,663 B2 2/2018 Lim et al.
2002/0182490 A1 12/2002 Cho et al.
(Continued)

FOREIGN PATENT DOCUMENTS

CN 1484867 A 3/2004
CN 102024934 A 4/2011
(Continued)

OTHER PUBLICATIONS

Extended European Search Report issued by the European Patent Office dated Feb. 8, 2022 in a corresponding European Patent Application No. 19910231.0.
(Continued)

*Primary Examiner* — Alix E Eggerding
(74) *Attorney, Agent, or Firm* — MORGAN, LEWIS & BOCKIUS LLP

(57) ABSTRACT

The present invention relates to a negative electrode for a lithium metal battery, a manufacturing method thereof, and a lithium metal battery including the same.
Specifically, in an embodiment of the present invention, in order to improve conductivity while improving adhesion between the negative electrode current collector and the negative electrode active material of a lithium metal battery, an adhesive layer including a binder and a conductive material is provided between the negative current collector and the negative electrode active material.

12 Claims, 8 Drawing Sheets

(51) Int. Cl.
  *H01M 4/38*     (2006.01)
  *H01M 4/505*    (2010.01)
  *H01M 4/525*    (2010.01)
  *H01M 4/66*     (2006.01)
  *H01M 10/052*   (2010.01)
  *H01M 10/0585*  (2010.01)
  *H01M 4/02*     (2006.01)

(52) U.S. Cl.
  CPC ........... *H01M 4/525* (2013.01); *H01M 4/661* (2013.01); *H01M 10/052* (2013.01); *H01M 10/0585* (2013.01); *H01M 2004/021* (2013.01)

(56) References Cited

U.S. PATENT DOCUMENTS

| | | | |
|---|---|---|---|
| 2005/0079416 | A1 | 4/2005 | Ohzuku et al. |
| 2010/0297490 | A1 | 11/2010 | Takami et al. |
| 2011/0064973 | A1 | 3/2011 | Song |
| 2011/0135987 | A1 | 6/2011 | Shin |
| 2014/0154552 | A1 | 6/2014 | Hong et al. |
| 2014/0377657 | A1 | 12/2014 | Lim et al. |
| 2015/0279577 | A1* | 10/2015 | Uchida ................. H01G 11/60 429/324 |
| 2016/0087312 | A1 | 3/2016 | Lee et al. |
| 2016/0156012 | A1* | 6/2016 | Takahashi ........... H01M 50/536 429/163 |
| 2017/0077514 | A1 | 3/2017 | Cho et al. |
| 2017/0256767 | A1* | 9/2017 | Popovici ............. H01M 50/431 |
| 2018/0034028 | A1 | 2/2018 | Jung et al. |
| 2018/0212277 | A1 | 7/2018 | Park et al. |
| 2019/0115596 | A1 | 4/2019 | Kajiyama et al. |
| 2019/0379087 | A1* | 12/2019 | Oh ...................... H01M 10/052 |
| 2020/0321584 | A1 | 10/2020 | Jung et al. |

FOREIGN PATENT DOCUMENTS

| | | |
|---|---|---|
| CN | 104170150 A | 11/2014 |
| CN | 104681895 A | 6/2015 |
| CN | 104956537 A | 9/2015 |
| CN | 105655624 A | 6/2016 |
| CN | 106133991 A | 11/2016 |
| CN | 106463766 A | 2/2017 |
| JP | H05-166538 A | 7/1993 |
| JP | H07-312226 A | 11/1995 |
| JP | 2009-231245 A | 10/2009 |
| JP | 2011-034693 A | 2/2011 |
| JP | 2014-075285 A | 4/2014 |
| KR | 10-2001-0086415 A | 9/2001 |
| KR | 10-2003-0023819 A | 3/2003 |
| KR | 10-0439351 B1 | 7/2004 |
| KR | 10-0494403 B1 | 6/2005 |
| KR | 10-2012-0079046 A | 7/2012 |
| KR | 10-2013-0117711 A | 10/2013 |
| KR | 10-2015-0104675 A | 9/2015 |
| KR | 10-2017-0025772 A | 3/2017 |
| KR | 10-2017-0099748 A | 9/2017 |
| KR | 2018-0103734 A | 9/2018 |
| KR | 10-2018-0124996 A | 11/2018 |

OTHER PUBLICATIONS

International Search Report (with partial translation) and Written Opinion dated Apr. 13, 2020, issued in corresponding International Patent Application No. PCT/KR2019/018124.
Office Action issued in Chinese Patent Application No. 201980088870.X dated Mar. 29, 2024.

* cited by examiner

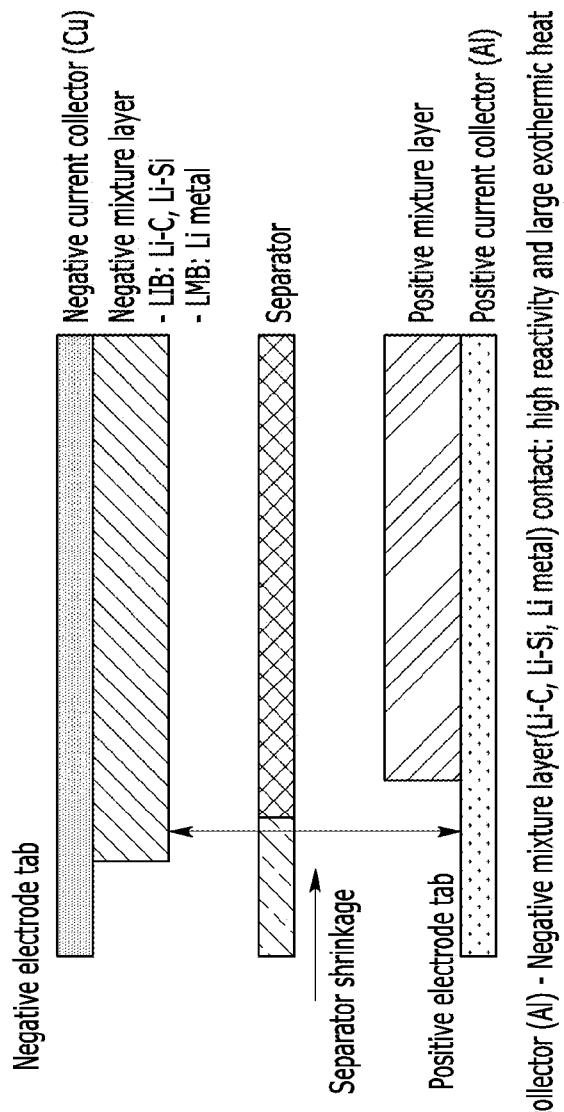

LITHIUM METAL BATTERY

CROSS-REFERENCE TO RELATED APPLICATION(S)

This application claims priority to and the benefit of Korean Patent Application No. 10-2019-0006229 filed in the Korean Intellectual Property Office on Jan. 17, 2019, the entire contents of which are incorporated herein by reference.

TECHNICAL FIELD

The present invention relates to a lithium metal battery.

BACKGROUND ART

Disclosure

A lithium secondary battery is a lithium ion battery that generally uses a carbon-based negative electrode (e.g., a negative electrode mixture layer including a carbon-based negative active material such as graphite formed on a negative current collector), and that implements movement of lithium ions through a liquid electrolyte including a lithium salt dissolved in an organic solvent.

In a design of such a lithium ion battery, it is common to make a cross-sectional area of the carbon-based negative electrode be relatively larger than that of the positive electrode. During charge, all lithium ions derived from the positive electrode are intercalated into the negative electrode active material to suppress a growth of lithium dendrites.

On the other hand, a lithium metal battery is implemented in such a way that lithium ions are reduced and precipitated from the negative electrode to lithium metals during charge, and lithium metals are oxidized into lithium ions during discharge, by using a negative current collector alone or a negative electrode coated with a lithium metal layer on the negative current collector.

Unlike lithium ion batteries, in which capacity of the entire battery is determined by a combination of the positive electrode capacity and the negative electrode capacity, since capacity (i.e., energy density) of the lithium metal battery is determined by the positive electrode, relatively narrowing a cross-sectional area of the positive electrode may be lowering an energy density.

On the other hand, regardless of types of battery, if the cross-sectional area of the positive electrode is smaller than the cross-sectional area of the negative electrode, an electrode assembly in which a positive electrode tab (positive current collector) and a lithium metal layer of the negative electrode face each other with a separator therebetween may be produced. When driving a battery including the electrode assembly of this type, if the separator contracts due to a rise in cell temperature, and the positive current collector and the negative electrode mixture layer or the lithium metal are in direct contact, an exothermic reaction may occur in the battery, resulting in a safety accident. This accident may occur at a greater level in lithium metal batteries than in lithium ion batteries.

SUMMARY OF THE INVENTION

Technical Problem

The present invention provides a lithium metal battery having improved energy density and safety. An embodiment of the present invention provides a lithium metal battery in which the cross-sectional area of the positive electrode is configured to be equal to or larger than that of the lithium metal negative electrode.

Technical Solution

Specifically, the lithium metal battery according to an embodiment of the present invention includes a lithium metal negative electrode; a positive electrode having a cross-sectional area equal to or greater than that of the lithium metal negative electrode; and a separator disposed between the lithium metal negative electrode and the positive electrode.

DESCRIPTION OF THE DRAWINGS

FIG. 4 is a view illustrating a problem in driving a battery including the laminate of FIG. 2A or 3A.

MODE FOR INVENTION

In the present specification, unless explicitly described to the contrary, the word "comprise" and variations such as "comprises" or "comprising" will be understood to imply the inclusion of stated elements but not the exclusion of any other elements. As used throughout the present specification, terms such as "about", "substantially", and the like that are specific to the reference means in manufacturing and material tolerances when present is used as in the figure or a figure close means, the understanding of the present accurate or is used to prevent the use of unfair self-absolute levels of unscrupulous infringers mentioned the disclosure of violations to help. As used throughout the present specification, "step to" or "step of" does not mean "step for."

As used throughout the present specification, "a combination(s) thereof" included in a Markush type means a mixture or a combination of one or more selected from constituent elements described in the expression of the Markush type and is meant to include at least one selected from the constituent elements.

Embodiments of the present invention will be described in detail based on the above definitions. However, it should be understood that the embodiments are merely examples, the present invention is not limited thereto, and the present invention is only defined by the scope of the following claims.

Figure 1A:
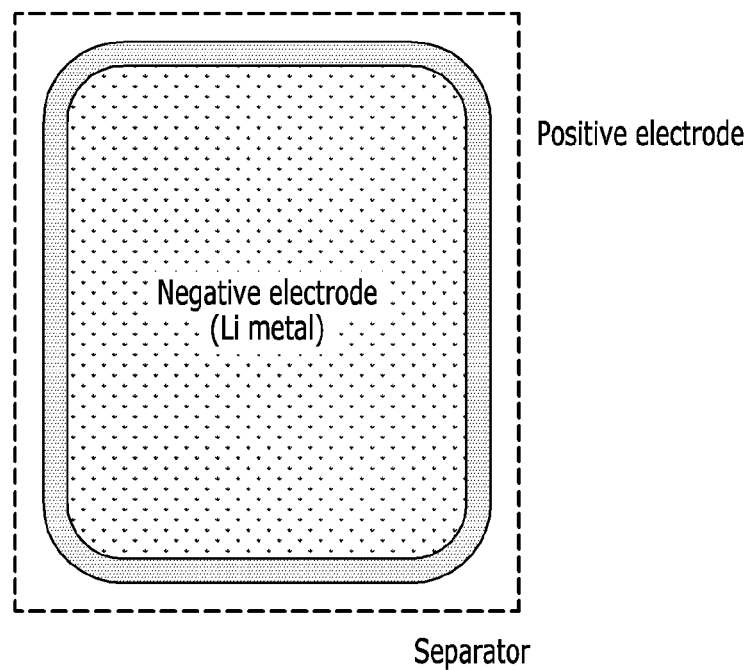
FIG. 1A is a top view (schematic view) of a laminate in which a positive electrode, a separator, and a lithium metal negative electrode are sequentially stacked by configuring a cross-sectional area of a positive electrode to be larger than that of a lithium metal negative electrode according to the embodiment.
Figure 1B:
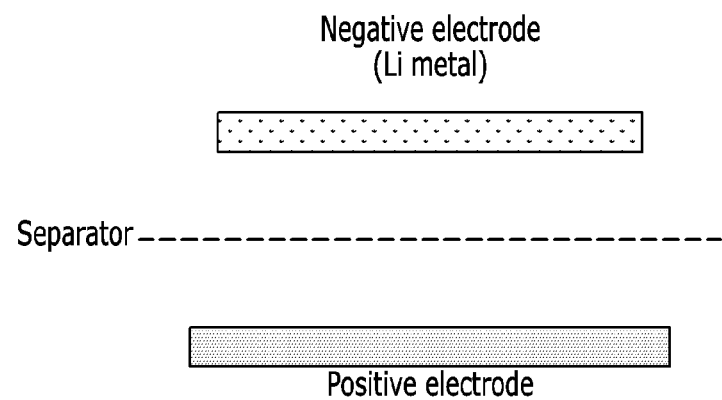
FIG. 1B is a side view (schematic view) of the laminate in FIG. 1A.

In an embodiment of the present invention, as shown in FIGS. 1A and 1B, by configuring a cross-sectional area of the positive electrode relatively larger than a cross-sectional area of the lithium metal negative electrode, provided is a lithium metal battery having improved energy density per weight and energy density per volume compared with the lithium ion battery including a carbon-based negative electrode.

1) A general lithium secondary battery is a lithium ion battery using a carbon-based negative electrode (e.g., manufactured by forming a negative electrode mixture layer including a carbon-based negative active material such as graphite and the like on a negative current collector) and realizing movement of lithium ions through a liquid electrolyte prepared by dissolving a lithium salt in an organic solvent as a medium.

However, when the carbon-based negative active material is locally insufficient, the lithium ions derived from a positive electrode are not intercalated into the carbon-based negative active material but nonuniformly precipitated (plated) as a lithium metal on the surface of the negative electrode during the charge of the lithium ion battery.

In this way, the lithium metal nonuniformly precipitated on the surface of the carbon-based negative electrode grows as a dendrite and then, passes a separator and causes a short circuit or forms a stable interface (a solid-electrolyte interface) between the carbon-based negative electrode and the electrolyte and thus depletes the electrolyte solution and the like and results in reducing a battery cycle-life.

Figure 2A:
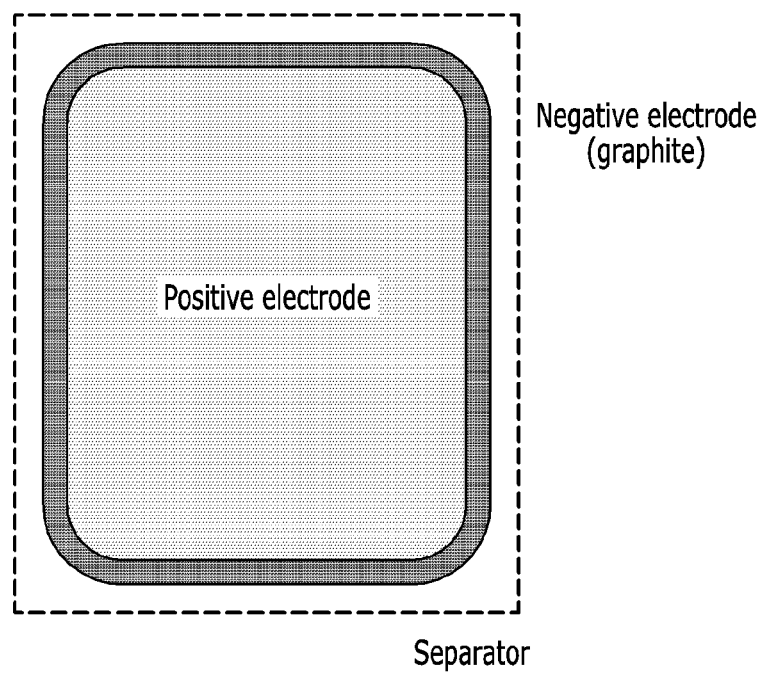
FIG. 2A is a top view (schematic view) of a laminate in which the positive electrode, the separator, and the carbon-based negative electrode are sequentially stacked by configuring a cross-sectional area of the carbon-based negative electrode to be larger than that of the positive electrode according to a general design method.
Figure 2B:
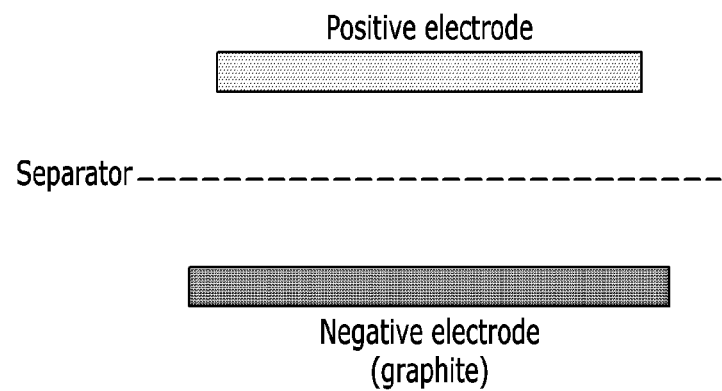
FIG. 2B is a side view (schematic view) of the laminate of FIG. 2A.

In order to prevent this phenomenon in advance, the lithium ion battery is in general designed to have a relatively larger cross-sectional area of the carbon-based negative electrode than that of the positive electrode. Specifically, as shown in FIGS. 2A and 2B, when the carbon-based negative electrode has a relatively larger cross-sectional area than that of the positive electrode, the lithium ions derived from the positive electrode during the charge are all intercalated into the negative active material and thus suppress growth of the lithium dendrite.

In this way, when the cross-sectional area of the positive electrode is formed to be smaller than that of the negative electrode, a positive electrode tab (a positive current collector) and the negative electrode mixture layer are faced with the separator therebetween to form an electrode assembly. Herein, as shown in FIG. 4, when the separator is shrunk due to a cell temperature increase and the like, the positive current collector may directly contact with the negative electrode mixture layer and accordingly, cause a large exothermic reaction and thus an safety accident such as a thermal runaway and the like.

2) On the contrary, a lithium metal battery uses the negative current collector alone or a negative electrode manufactured by coating a lithium metal layer on the negative current collector, so that the lithium ions are reduced and precipitated into a lithium metal at the negative electrode during the charge, while the lithium metal is oxidized into the lithium ions during the discharge. The lithium metal battery is operated through precipitation of the lithium metal at the negative electrode every cycle and thus has a feature of using an electrolyte and a separator material, which are appropriate for suppressing the lithium dendrite and preventing the short circuit.

Figure 3A:
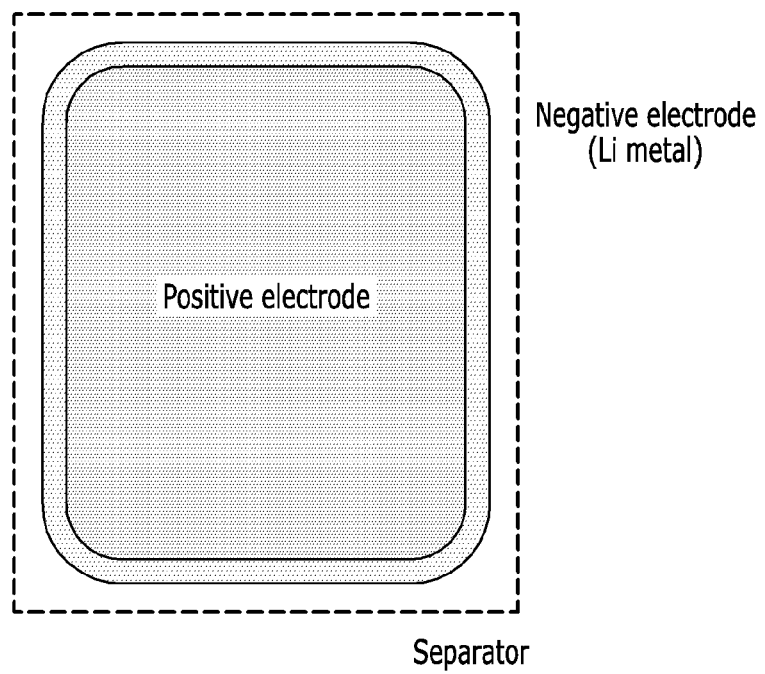
FIG. 3A is a top view (schematic view) of a laminate in which the positive electrode, the separator, and the lithium metal negative electrode are sequentially stacked by configuring a cross-sectional area of the lithium metal negative electrode to be larger than that of the positive electrode according to a general design method.
Figure 3B:
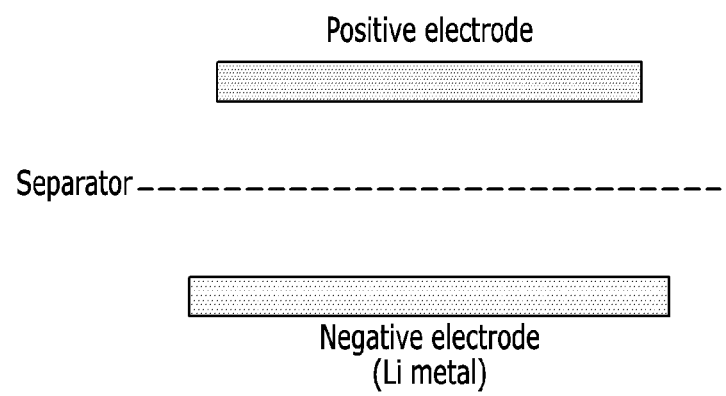
FIG. 3B is a side view (schematic view) of the laminate of FIG. 3A.
Figure 5:
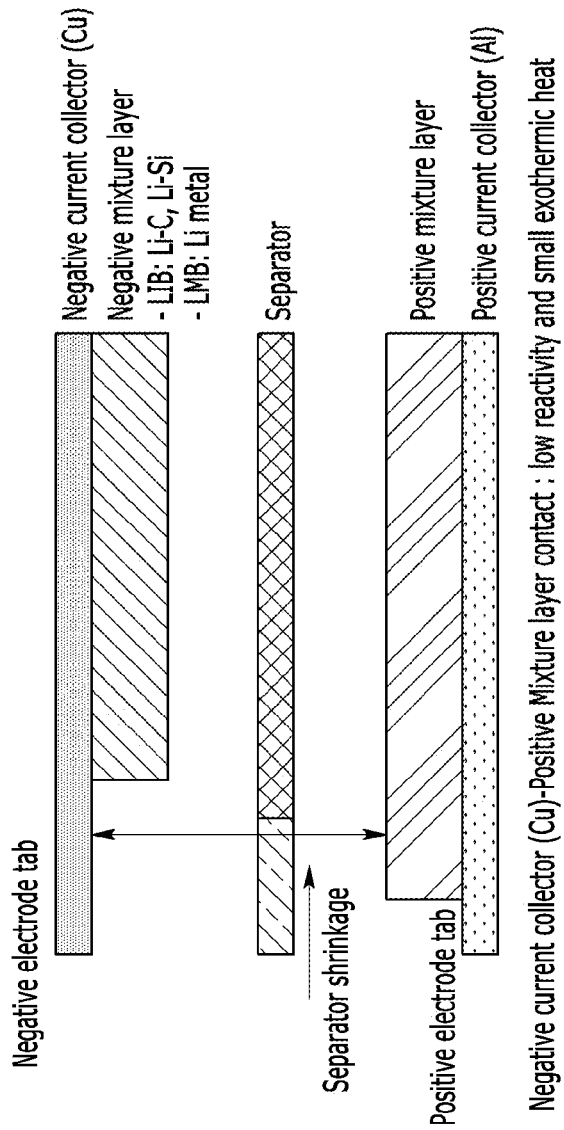
FIG. 5 is a view illustrating an advantage in driving a battery including the laminate of FIG. 1A.

This lithium metal battery has a merit of improving energy density per volume and energy density per weight compared with the lithium ion battery by greatly reducing a thickness of the negative electrode mixture layer. Unlike the lithium ion battery having entire battery capacity determined by a combination of positive electrode capacity and negative electrode capacity, it is the positive electrode that determines entire battery capacity (i.e., energy density) of the lithium metal battery. Accordingly, as shown in FIGS. 3A and 3B, relatively reducing the cross-sectional area of cross-sectional area of the positive electrode is not different from lowering the energy density of the battery.

In addition, like the lithium ion battery, when the lithium metal battery has a smaller cross-section of the positive electrode than that of the negative electrode, the positive electrode tab (the positive current collector) and the lithium metal layer of the negative electrode face each other with the separator therebetween to form an electrode assembly. Herein, as shown in FIG. 4, when the separator is shrunk due to a cell temperature increase and the like, and the positive current collector directly contacts with the lithium metal layer of the negative electrode, a larger exothermic reaction than that of the lithium ion battery may occur and thus cause a larger safety accident.

Since the lithium metal battery of the embodiment uses a lithium metal negative electrode having a higher theoretical discharge capacity than that of the carbon-based negative electrode, a loading amount of the negative active material may relatively be reduced, and a thickness of the negative electrode may be designed to be thin. In this way, when the lithium metal is used as a negative active material, the reduction of the loading amount of the negative active material and the design alone of the thickness of the negative electrode to be thin may improve energy density per weight and energy density per volume of a battery.

1) In addition, since the lithium metal battery of the embodiment is designed to make the cross-sectional area of the positive electrode determining capacity (i.e., energy density) of the battery larger than that of a negative electrode, energy density per weight and energy density per volume may be further improved.

2) Furthermore, the lithium metal battery of the embodiment has an advantage of inducing a contact of the positive electrode mixture layer having a small exothermic amount with the negative current collector during contraction of the separator due to a cell temperature increase and thus preventing a thermal runaway and improving safety.

Hereinafter, a design of the lithium metal battery of the embodiment will be described in more detail.

Cross-sectional Area of Each Constituent Element

In a lithium metal battery that is generally known before the embodiment, as shown in FIGS. 3A and 3B, a cross-sectional area of the negative electrode is designed to be 1.02 times to 1.2 times a cross-sectional area of the positive electrode.

However, in the embodiment, the cross-sectional area of the positive electrode may be designed to be 1.0 time to 1.3 times, and specifically 1.03 times to 1.2 times, or 1.05 times to 1.1 times the cross-sectional area of the lithium metal negative electrode.

As the cross-sectional area of the positive electrode is designed to be larger than that of a general lithium metal battery, the lithium metal battery of the embodiment may have an improved energy density per weight and energy density per volume. However, in the embodiment, the cross-sectional area of the positive electrode is designed to be the same as or relatively larger than that of the lithium metal negative electrode but is not limited within the numerical range.

On the other hand, the cross-sectional area of the separator may be designed to be 1.01 to 1.3 times as large as that of the lithium metal negative electrode. In this way, since the cross-sectional area of the lithium metal negative electrode is relatively smaller than that of the separator, the lithium metal negative electrode and the separator have so large an extra space therebetween that the lithium dendrite may rarely contact the positive electrode.

However, the cross-sectional area of the separator is designed to be relatively larger than that of the positive electrode but not limited within the numerical range.

Structure of Lithium Metal Negative Electrode

The lithium metal negative electrode of the embodiment has no structural difference from the lithium metal negative electrode generally known before the embodiment, except for the specificity of the cross-sectional area.

Specifically, the lithium metal negative electrode of the embodiment may be a copper current collector alone having a thickness of 1 to 20 μm; or may include a lithium metal layer having a thickness of 1 to 100 μm, for example 1 to 50 μm which is coated on the both surfaces or one surface of the copper current collector.

Structure of Positive Electrode

The positive electrode of the embodiment also has no structural difference from the positive electrode of a lithium metal battery generally known before the embodiment except for the specificity of the cross-sectional area.

Specifically, the positive electrode of the embodiment may include an aluminum current collector; and a positive active material layer disposed on the aluminum current collector and including a lithium metal oxide.

Herein, as the lithium metal oxide may be composite metal oxides such as $LiCoO_2$, $LiMn_2O_4$, $LiNiO_2$, $LiNi_{1-x}Co_xO_2$ (0<x<1), $LiMnO_2$, and the like that are generally known as positive active materials.

Alternatively, the lithium metal oxide may be represented by Chemical Formula 1:

$Li_xMeM1_dO_2$      [Chemical Formula 1]

In Chemical Formula 1, M1 is Zr, Mg, Al, Ni, Mn, Zn, Fe, Cr, Mo, or W, Me is represented by Chemical Formula 2,

$Ni_aCo_bMn_c$      [Chemical Formula 2]

In Chemical Formulae 1 and 2, 0.97≤x≤1.03, 0.50≤a≤0.90, 0<b≤0.3, 0<c≤0.3, 0≤d<0.01, and a+b+c+d=1.

The lithium metal oxide represented by Chemical Formula 1 is a positive active material known as NCM, and has a layered structure as a crystal structure, and may have higher energy density than that of the composite metal oxides such as $LiCoO_2$, $LiMn_2O_4$, $LiNiO_2$, $LiNi_{1-x}Co_xO_2$ (0<x<1), $LiMnO_2$, and the like.

More specifically, in Chemical Formula 2, as a has a higher value within the above range, it may contribute to an improvement in output of the battery, but the embodiment is not limited thereto.

Regardless of the composition of the lithium metal oxide, one having a coating layer on its surface may be used, or a mixture of the lithium metal oxide and a compound having the coating layer may be used. The coating layer may include an oxide of a coating element, a hydroxide of a coating element, an oxyhydroxide of a coating element, an oxycarbonate of a coating element, or a hydroxycarbonate of a coating element, as a coating element compound. The compounds constituting these coating layers may be amorphous or crystalline. The coating element included in the coating layer may be Mg, Al, Co, K, Na, Ca, Si, Ti, V, Sn, Ge, Ga, B, As, Zr, or a mixture thereof. The coating layer may be formed in a method having no adverse influence on properties of a positive active material by including these elements in the compound. For example, the method may include any coating method such as spray coating, dipping, and the like, but is not illustrated in more detail, since it is well-known to a person having an ordinary skill in the related field.

The positive active material layer of the embodiment may further include an irreversible compensation positive electrode material. The lithium ions of the irreversible compensation additive are deintercalated during the initial charging of the lithium secondary battery to supply lithium ions on a single layer of the negative current collector, and the irreversible compensation additive from which the lithium ions are deintercalated is converted into an irreversible phase not to intercalate lithium ions. Herein, the irreversible compensation additive may be one or more selected from $Li_2NiO_2$, $Li_2CuO_2$, $Li_6CoO_4$, $Li_5FeO_4$, $Li_6MnO_4$, $Li_2MoO_3$, $Li_3N$, $Li_2O$, LiOH, and $Li_2CO_3$. The irreversible compensation additive may be included in the range of 1 to 50 wt % of the total weight of the positive active material, but the present invention is not limited thereto.

The positive active material layer of the embodiment may further include a binder, and optionally, a conductive material, a filler, and the like.

The conductive material is not particularly limited as long as it has conductivity without causing chemical change in the battery and may be, for example, graphite such as natural graphite or artificial graphite, and the like; carbon black such as carbon black, acetylene black, ketjen black, channel black, furnace black, lamp black, summer black, and the like; a conductive fiber such as a carbon fiber or a metal fiber, and the like; carbon fluoride, a metal powder such as aluminum, nickel powder, and the like; a conductive whisker such as zinc oxide, potassium titanate, and the like; a conductive metal oxide such as a titanium oxide, and the like; a conductive material such as a polyphenylene derivative, and the like.

The binder adheres to the positive electrode active material particles, and also adheres the positive electrode active material to the current collector well, and examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Electrolyte Composition and Separator Material

The lithium metal battery of the embodiment may further include an electrolyte impregnated in the separator.

The electrolyte may also be selected from those that are generally applied to lithium metal batteries. In this case, the impregnation may mean that the electrolyte is disposed in the pores in the separator.

When a solid electrolyte is used as the electrolyte of the lithium metal battery, the solid electrolyte may also serve as a separator. The solid electrolyte may be an organic solid electrolyte, an inorganic solid electrolyte, or a mixture thereof.

The organic solid electrolyte may be, for example, a polyethylene derivative, a polyethylene oxide derivative, a polypropylene oxide derivative, a phosphoric acid ester polymer, a poly agitation lysine, polyester sulfide, polyvinyl alcohol, polyvinylidene fluoride, a polymer including an ionic leaving group, and the like.

The inorganic solid electrolyte may be, for example, Li nitrides, halides, sulfates and the like such as $Li_3N$, LiI, $LiSNI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

On the other hand, when a liquid electrolyte is used as the electrolyte of the lithium metal battery, the liquid electrolyte includes a non-aqueous organic solvent and a lithium salt.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), and ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methylpropionate, ethyl propionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, fluorinated ether, and the like and the ketone-based solvent may include cyclohexanone, and the like. In addition, the alcohol-based solvent may include ethyl alcohol, isopropyl alcohol, and the like, and the aprotic solvent may include nitrile such as R—CN (wherein R is a $C_2$ to $C_{20}$ linear, branched, or cyclic hydrocarbon group, a double bond, an aromatic ring, or an ether bond), amides such as dimethyl formamide, dioxolane such as 1,3-dioxolane, and sulfolane.

The non-aqueous organic solvent may be used alone or in a mixture, and when the organic solvent is used in a mixture, the mixture ratio may be controlled in accordance with a desirable cell performance.

The carbonate-based solvent is prepared by mixing a cyclic carbonate and a linear carbonate. The cyclic carbonate and the linear carbonate are mixed together in a volume ratio of about 1:1 to about 1:9, in which performance of electrolyte may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon compound of Chemical Formula 1.

[Chemical Formula 1]

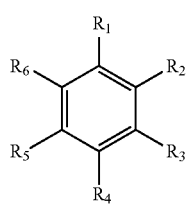

In Chemical Formula 1, $R_1$ to $R_6$ are independently hydrogen, a halogen, a C1 to C10 alkyl group, a C1 to C10 haloalkyl group, or a combination thereof.

The aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of Chemical Formula 2 in order to improve battery cycle-life.

[Chemical Formula 2]

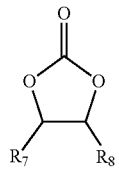

In Chemical Formula 2, $R_7$ and $R_8$ are independently hydrogen, a halogen, a cyano group (CN), a nitro group ($NO_2$), or a $C_1$ to $C_5$ fluoroalkyl group, provided that at least one of $R_7$ and R& is a halogen, a cyano group (CN), a nitro group ($NO_2$), or a $C_1$ to $C_5$ fluoroalkyl group.

Examples of the ethylene carbonate compound may include difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle-life may be adjusted within an appropriate range.

The lithium salt dissolved in the organic solvent may act as a source of lithium ions to enable a basic operation of the lithium metal battery of the embodiment and may serve to promote movement of lithium ions between the positive electrode and the negative electrode.

The lithium salt may be a lithium salt that is generally applicable to electrolyte solution. For example, the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate; LiBOB) or a combination thereof, but is not limited thereto.

In addition, in the electrolyte solution, a concentration of the lithium salt may be adjusted within the range of 0.1 to 10.0 M. In this range, the electrolyte solution may have an appropriate conductivity and viscosity, and lithium ions may effectively move in the lithium metal battery of the embodiment. However, this is only an example, and thus the present invention is not limited.

The electrolyte solution may be impregnated in a porous separator disposed between the negative electrode and the positive electrode. Herein, the porous separator may include any materials commonly used in the conventional lithium battery as long as separating a negative electrode from a positive electrode and providing a transporting passage for lithium ions. In other words, the separator may have a low resistance to ion transportation and an excellent impregnation for an electrolyte.

For example, it may be selected from a glass fiber, polyester, Teflon, polyethylene, polypropylene, polytetrafluoroethylene (PTFE), or a combination thereof and may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Specific Embodiment of Battery

In another embodiment of the present invention, a battery pack including the lithium metal battery of the above embodiment is provided.

In the battery pack, the configuration except for the lithium metal battery of the embodiment is generally known in the art, and detailed description thereof will be omitted.

The battery pack may be used as a power source for the device.

Specific examples of the device may be, but are not limited to, an electric vehicle, a hybrid electric vehicle, a plug-in hybrid electric vehicle, or a power storage system.

Hereinafter, preferred examples of the present invention, comparative examples, and experimental examples for evaluating them are described. However, the following examples are only preferred examples of the present invention, and the present invention is not limited to the following examples.

Example 1: Lithium Metal Battery (1) Wherein Cross-sectional Area of Positive Electrode>Cross-sectional Area of Negative Electrode (1) Manufacture of Lithium Metal Negative Electrode A Li/Cu/Li-structured foil (a total thickness: 50 μm) covered with a 20 μm lithium foil (Li foil) on both surfaces of a 10 μm-thick copper current collector was punched to have a width of 33 mm and a length of 50 mm to prepare a lithium metal negative electrode of Example 1.

(2) Manufacture of Positive Electrode $LiNi_{0.8}Mn_{0.1}Co_{0.1}O_2$ as a positive active material, carbon black as a conductive material, and polyvinylidene fluoride (PVdF) as the binder, respectively were mixed in a weight ratio of a positive active material:conductive material:binder of 96:2:2 and the mixture was added to NMP as a solvent, to prepare positive active material slurry.

The positive active material slurry was coated to be respectively 75 μm thick on both surfaces of a 12 μm-thick aluminum current collector, dried, compressed, and then, punched to have a width of 34 mm and a length of 51 mm and thus to manufacture a positive electrode according to Example 1.

(3) Manufacture of Lithium Metal Battery

A stack cell was manufactured by disposing a separator (a polypropylene-based porous polymer substrate having a width of 35 mm, a length of 54 mm, and a thickness of 12 μm) between the lithium metal negative electrode of Example 1 and the positive electrode of Example 1.

An electrolyte solution in which 3M LiFSI was dissolved in a solvent in which fluoroethylene carbonate (FEC) and ethylmethyl carbonate (EMC) were mixed at a volume ratio of 30:70 was injected into the stack cell, thereby manufacturing a lithium metal battery cell of Example 1.

Example 2: Lithium Metal Battery Wherein Cross-Sectional Area of Positive Electrode=Cross-Sectional Area of Negative Electrode (1) Manufacture of Lithium Metal Negative Electrode A lithium metal negative electrode of Example 2 was manufactured according to the same method as Example 1 except that the punching size was changed into a width of 34 mm and a length of 51 mm.

(2) Manufacture of Positive Electrode

A positive electrode of Example 2 was manufactured according to the same method as Example 1 except that the punching size was changed into a width of 34 mm and a length of 51 mm.

(3) Manufacture of Lithium Metal Battery

A lithium metal battery cell of Example 2 was manufactured according to the same method as Example 1 except that the lithium metal negative electrode and the positive electrode according to Example 2 were used.

Example 3: Lithium Metal Battery (2) Wherein Cross-Sectional Area of Positive Electrode>Cross-Sectional Area of Negative Electrode (1) Manufacture of Lithium Metal Negative Electrode A lithium metal negative electrode of Example 3 was manufactured according to the same method as Example 1 except that the punching size was changed into a width of 45 mm and a length of 65 mm.

(2) Manufacture of Positive Electrode

A positive electrode of Example 3 was manufactured according to the same method as Example 1 except that the punching size was changed into a width of 43 mm and a length of 62 mm.

(3) Manufacture of Lithium Metal Battery

A lithium metal battery cell of Example 3 was manufactured according to the same method as Example 1 except that the lithium metal negative electrode and the positive electrode according to Example 3 were used.

Comparative Example 1: Lithium Ion Battery Cell Wherein Cross-Sectional Area of Negative Electrode>Cross-Sectional Area of Positive Electrode (1) Manufacture of Carbon-Based Negative Electrode Graphite as negative active material, carbon black as a conductive material, and SBR-CMC as a binder were mixed in in a weight ratio of a negative active material:conductive material:binder of 96:2:2 and the mixture was added to distilled water as a solvent, to prepare negative active material slurry.

The negative active material slurry was coated to be respectively 80 μm thick on both surfaces of a 10 μm-thick copper current collector, dried, compressed, and punched to have a width of 34 mm and a length of 51 mm and thus to manufacture a negative electrode according to Comparative Example 1.

(2) Manufacture of Positive Electrode

A positive electrode of Comparative Example 1 was manufactured according to the same method as Example 1 except that the punching size was changed into a width of 33 mm and a length of 50 mm.

(3) Manufacture of Lithium Ion Battery Cell

A stack cell was manufactured by disposing a separator (a polypropylene-based porous polymer substrate having a width of 35 mm, a length of 54 mm, and a thickness of 12 μm) between the carbon-based negative electrode of Comparative Example 1 and the positive electrode of Comparative Example 1.

An electrolyte solution in which 1M $LiPF_6$ was dissolved in a solvent in which fluoroethylene carbonate (FEC) and ethylmethyl carbonate (EMC) were mixed at a volume ratio of 30:70 was injected into the stack cell, thereby manufacturing a Lithium metal secondary battery cell of Comparative Example 1.

Comparative Example 2: Lithium Ion Battery Cell (2) Wherein Cross-Sectional Area of Negative Electrode<Cross-Sectional Area of Positive Electrode (1) Manufacture of Carbon-Based Negative Electrode A lithium metal negative electrode of Comparative Example 2 was manufactured according to the same method as Comparative Example 1 except that the punching size was changed into a width of 43 mm and a length of 62 mm.

(2) Manufacture of Positive Electrode

A positive electrode of Comparative Example 2 was manufactured according to the same method as Comparative Example 1 except that the punching size was changed into a width of 45 mm and a length of 65 mm.

(3) Manufacture of Lithium Ion Battery Cell

A lithium ion battery cell of Comparative Example 2 was manufactured according to the same method as Comparative Example 1 except that the carbon-based negative electrode according to Comparative Example 2 and the positive electrode according to Comparative Example 2 were used.

Comparative Example 3: Lithium Metal Battery Cell (1) Wherein Cross-Sectional Area of Negative Electrode>Cross-Sectional Area of Positive Electrode (1) Manufacture of Lithium Metal Negative Electrode A lithium metal negative electrode of Comparative Example 3 was manufactured according to the same method as Example 1 except that the punching size was changed into a width of 34 mm and a length of 51 mm.

(2) Manufacture of Positive Electrode

A positive electrode of Comparative Example 3 was manufactured according to the same method as Example 1 except that the punching size was changed into a width of 33 mm and a length of 50 mm.

(3) Manufacture of Lithium Metal Battery Cell

A lithium metal battery cell of Comparative Example 3 was manufactured according to the same method as Example 1 except that the lithium metal negative electrode of Comparative Example 3 and the positive electrode of Comparative Example 3 were used.

Comparative Example 4: Lithium Metal Battery Cell (2) Wherein Cross-Sectional Area of Negative Electrode>Cross-Sectional Area of Positive Electrode (1) Manufacture of Lithium Metal Negative Electrode A lithium metal negative electrode of Comparative Example 4 was manufactured according to the same method as Example 1 except that the punching size was changed into a width of 45 mm and a length of 65 mm.

(2) Manufacture of Positive Electrode

A positive electrode of Comparative Example 4 was manufactured according to the same method as Example 1 except that the punching size was changed into a width of 43 mm and a length of 62 mm.

(3) Manufacture of Lithium Metal Battery Cell

A lithium metal battery cell of Comparative Example 4 was manufactured according to the same method as Example 1 except that the lithium metal negative electrode of Comparative Example 4 and the positive electrode of Comparative Example 4 were used.

Experimental Example 1 (Evaluation of Cell Thickness)

Thicknesses of the battery cells according to Examples 1 to 3 and Comparative Examples 1 to 4 were measured, and the results are shown in Table 1.

TABLE 1

| | Negative active material | Ratio of cross-sectional area of positive electrode/cross-sectional area of negative electrode | Total thickness of cell (mm) |
| --- | --- | --- | --- |
| Comparative Example 1 | Graphite | about 0.95 | 6.44 |
| Comparative Example 2 | Graphite | about 1.05 | 6.48 |
| Comparative Example 3 | Lithium metal | about 0.95 | 4.58 |
| Comparative Example 4 | Lithium metal | about 0.90 | 4.58 |
| Example 1 | Lithium metal | about 1.05 | 4.58 |
| Example 2 | Lithium metal | about 1.0 | 4.59 |
| Example 3 | Lithium metal | about 1.1 | 4.61 |

Referring to Table 1, when the lithium metal negative electrodes were applied (Comparative Examples 3 and 4 and Examples 1 to 3), thicknesses of the negative electrodes were reduced and thus contributed to reducing entire battery thicknesses compared with when the carbon-based negative electrodes were applied (Comparative Examples 1 and 2).

As aforementioned, since the lithium metal battery cells used the lithium metal negative electrodes having higher theoretical discharge capacity than the carbon-based negative electrodes, a loading amount of a negative active material was relatively reduced, and a negative electrode thickness was designed to be thin.

In this way, when a lithium metal may be used as a negative active material, reducing a loading amount of the negative active material and the design alone of the thickness of the negative electrode to be thin may improve energy density per weight and energy density per volume of a battery.

Experimental Example 2 (Electrochemical Characteristics Evaluation of Battery Cell)

Each battery cell of Examples 1 to 3 and Comparative Examples 1 to 4 was measured with respect to initial capacity and number of cycles at which cycle 80% capacity relative to the initial capacity was measured was checked, while charge and discharge cycles proceeded under the following conditions, and the results are shown in Table 2.

Charge: 0.3C, CC/CV, 4.25V, 1/20C cut-off
Discharge: 0.5C, CC, 3.0 V, cut-off

In addition, energy density (initial capacity) per volume, per weight of each battery cell of Examples 1 to 3 and Comparative Examples 1 to 4 were calculated, and the results are shown in Table 2.

Specifically, Comparative Examples 1 and 3 were equally designed to have larger cross-sectional areas of negative electrodes, but the former was a lithium ion battery cell manufactured by applying a graphite-based negative electrode, while the latter was a lithium metal battery cell manufactured by applying a lithium metal negative electrode.

Comparing these battery cells, energy density of the lithium metal battery cells was higher than energy density of the equally designed lithium ion battery cells.

TABLE 2

| | Negative active material | Ratio of cross-sectional area of positive electrode/cross-sectional area of negative electrode | Initial capacity of cell (mAh) | Energy density per cell volume (Wh/L) | Energy density per cell weight (Wh/kg) | Cell cycle-life (Number of cycles at which 80% capacity was measured relative to initial capacity) |
|---|---|---|---|---|---|---|
| Comparative Example 1 | Graphite | about 0.95 | 1996 | 538 | 271 | 307 |
| Comparative Example 2 | Graphite | about 1.05 | 1883 | 507 | 256 | 138 |
| Comparative Example 3 | Lithium metal | about 0.95 | 2111 | 809 | 408 | 49 |
| Comparative Example 4 | Lithium metal | about 0.9 | 3535 | 837 | 434 | 40 |
| Example 1 | Lithium metal | about 1.05 | 2218 | 850 | 419 | 78 |
| Example 2 | Lithium metal | about 1.0 | 2191 | 850 | 410 | 77 |
| Example 3 | Lithium metal | about 1.1 | 3827 | 906 | 451 | 75 |

Table 2 provides design limitations of lithium ion battery cells, advantages of lithium metal battery cells equally designed to the lithium ion battery cells, and great effects when a design method of the lithium metal battery cells is changed.

(1) Design Limitations of Lithium Ion Batteries

First of all, comparison of the lithium ion battery cells of Comparative Examples 1 and 2 provides the design limitations.

Specifically, Comparative Examples 1 and 2 all were lithium ion battery cells, which are different in that the former was manufactured to have a larger cross-sectional area of a negative electrode, while the latter was designed to have a larger cross-sectional area of a positive electrode.

Comparing performances thereof, the lithium ion battery cell did not exhibit increased capacity or energy density even though the positive electrode was made larger but rather had a negative influence on a battery cycle-life.

Referring to this result, the lithium ion battery cell wherein a lithium metal precipitated at the negative electrode had a negative influence on battery performance (particularly, cycle-life characteristics) could not but adopt a design of suppressing growth of lithium dentrite by relatively making the cross-sectional area of the negative electrode larger than that of the positive electrode.

(2) Advantages of Lithium Metal Batteries Designed in the Same Way as Lithium Ion Batteries On the other hand, through the comparison of Comparative Examples 1 and 3, it is possible to confirm the advantages of the lithium metal battery designed in the same manner as the lithium ion battery.

(3) Great effects of Lithium Metal Battery Cells when Design Method was Changed

On the other hand, through comparison of Comparative Example 3 with Example 2, when the cross-sectional area of the positive electrode was equally designed to that of the negative electrode, a great effect was obtained.

Specifically, comparing performance of the lithium metal battery cells, when the positive electrode was designed to have the same sized cross-section as that of the negative electrode and thus all covered the negative electrode (Example 2) and when the negative electrode was designed to have a lager cross-section than that of the positive electrode (Comparative Example 3), the former exhibited much improved energy density per weight, per volume and in addition, increased cycle-life performance.

Furthermore, comparing Comparative Example 3 with Example 1 and Comparative Example 4 with Example 4, when positive electrodes were designed to have larger cross-sectional areas than those of negative electrodes in the lithium metal battery cells of an overall equal dimension, great effects were obtained.

Specifically, Comparative Example 3 and Example 1 were all lithium metal battery cells in the overall equal dimension. However, the former was designed to have a larger cross-sectional area of a negative electrode than that of a positive electrode, but the latter was designed to have a larger cross-sectional area of a positive electrode than that of a negative electrode.

Comparative Example 4 and Example 4 were the same lithium metal battery cells in the overall dimension, wherein the former was designed to include a negative electrode having a larger cross-section, while the latter was designed to include a positive electrode having a larger cross-section.

Referring to the evaluation results thereof, when the positive electrodes were designed to have a larger cross-section in the lithium metal battery cells of the same overall dimension, energy density per weight and energy density per volume thereof were much more improved, and cycle-life performance thereof also was increased.

(4) Summery

Putting together the above evaluation results, unlike an lithium ion battery cell in which lithium ions are intercalated into a negative active material at a negative electrode, a lithium metal battery using a basic operation principle that a lithium metal is precipitated in a lithium metal layer of a negative current collector or a negative electrode needs not to be designed to have a larger cross-sectional area of the negative electrode but an equal or larger cross-sectional area of the positive electrode than that of the negative electrode, which may contribute to improving battery performance.

Experimental Example 3 (Evaluation of Battery Cell Safety)

Safety of the battery cells of Examples 1 to 3 and Comparative Examples 3 to 4 was evaluated under the following conditions.

Charge: 0.1 C, CC/CV, 4.25 V, 1/20 C cut-off

The cells charged up to SOC 100 under the above charge condition were put in a heating chamber and heated up to 130° C. at 2° C./min. When an internal temperature of the chamber reached 130° C., the heating was stopped, and while the cells were maintained at the same temperature for 4 hours, whether the cells were ignited or not was examined, and maximum temperatures of the cells were measured.

TABLE 3

| | Negative active material | Ratio of cross-sectional area of positive electrode/cross-sectional area of negative electrode | Whether the cell is ignited | Cell maximum temperature (° C.) |
|---|---|---|---|---|
| Comparative Example 3 | Lithium metal | about 0.95 | O | 430 |
| Comparative Example 4 | Lithium metal | about 0.9 | O | 487 |
| Example 1 | Lithium metal | about 1.05 | X | 134 |
| Example 2 | Lithium metal | about 1.0 | X | 135 |
| Example 3 | Lithium metal | about 1.1 | X | 132 |

Referring to Table 3, the lithium metal battery cells having smaller cross-sectional areas of positive electrodes than those of negative electrodes (Comparative Examples 3 and 4) exhibited a thermal runaway phenomenon and were ignited thereby when the internal temperature thereof reached 130° C. On the contrary, the lithium metal battery cells having equal or larger cross-sectional areas of positive electrodes than those of negative electrodes (Examples 1 to 3) were less exothermic and thus not ignited.

Referring to the evaluation results, the thermal runaway was prevented by inducing a contact between less exothermic positive electrode mixture layers and negative current collectors instead of a contact between more exothermic positive current collectors and lithium metals during contraction of separators due to a cell temperature increase.

In other words, in order to improve safety of the lithium metal battery cells, the cross-sectional areas of the positive electrodes were designed to be equal to those of the negative electrodes and thus all cover the negative electrodes or larger than those of the negative electrodes.

INDUSTRIAL APPLICABILITY

A lithium metal battery cell of the embodiment may further improve energy density per weight and energy density per volume of the battery by designing a positive electrode determining capacity (i.e., energy density) of the battery to have an equal or larger cross-section than that of a lithium metal negative electrode.

Furthermore, the lithium metal battery of the embodiment may induce a contact between a less exothermic positive electrode mixture layer and a negative current collector instead of a contact between a more exothermic positive current collector and a lithium metal during contraction of a separator) due to a cell temperature increase and thus prevent a thermal runaway and more improve safety.

The invention claimed is:

1. A lithium metal battery comprising
a plurality of lithium metal negative electrodes;
a plurality of positive electrodes; and
a plurality of separators disposed between the lithium metal negative electrode and the positive electrode,
wherein all of the plurality of positive electrodes have a surface area greater than a surface area of all of the plurality of lithium metal negative electrodes.

2. The lithium metal battery of claim 1, wherein the surface area of the plurality of positive electrodes is 1.0 times to 1.2 times the surface area of the plurality of negative electrodes.

3. The lithium metal battery of claim 1, wherein the surface area of the plurality of separators separator is 1.01 times to 1.3 times the surface area of the plurality of positive electrodes.

4. The lithium metal battery of claim 1, wherein the plurality of lithium metal negative electrode comprises a copper current collector.

5. The lithium metal battery of claim 4, wherein a thickness of the copper current collector is 1 to 20 μm.

6. The lithium metal battery of claim 4, further comprising a lithium metal layer coated on both surfaces or one surface of the copper current collector.

7. The lithium metal battery of claim 6, wherein a thickness of the lithium metal layer is 1 to 100 μm.

8. The lithium metal battery of claim 1, wherein the plurality of positive electrodes comprises: an aluminum current collector; and a positive active material layer disposed on the aluminum current collector and including a lithium metal oxide.

9. The lithium metal battery of claim 8, wherein the lithium metal oxide is represented by Chemical Formula 1:

$$Li_xMeM1_dO_2 \qquad \text{[Chemical Formula 1]}$$

wherein, in Chemical Formula 1, M1 is Zr, Mg, Al, Ni, Mn, Zn, Fe, Cr, Mo, or W, Me is represented by Chemical Formula 2, $$Ni_aCo_bMn_c \qquad \text{[Chemical Formula 2]}$$

wherein, in Chemical Formulae 1 and 2, $0.97 \leq x \leq 1.03$, $0.50 \leq a \leq 0.90$, $0 < b \leq 0.3$, $0 < c \leq 0.3$, $0 \leq d < 0.01$, and $a+b+c+d=1$.

10. The lithium metal battery of claim 1, further comprising an electrolyte impregnated in the separator.

11. A battery pack comprising the lithium metal battery of claim 1.

12. The lithium metal battery of claim 1, wherein the surface area of the plurality of positive electrodes is 1.05 times to 1.1 times the surface area of the plurality of negative electrodes.

* * * * *